US012553809B2

(12) United States Patent
Narita et al.

(10) Patent No.: US 12,553,809 B2
(45) Date of Patent: Feb. 17, 2026

(54) LOAD SENSOR AND LOAD DETECTOR

(71) Applicants: TOHOKU UNIVERSITY, Sendai (JP); TOHOKU STEEL CO., LTD., Miyagi (JP)

(72) Inventors: Fumio Narita, Sendai (JP); Kumi Inoue, Sendai (JP); Hiroki Kurita, Sendai (JP); Shion Osana, Sendai (JP); Siti Masturah Binti Fakhruddin, Sendai (JP); Naoto Miyamoto, Sendai (JP); Masahito Watanabe, Shibata-gun (JP); Daiki Chiba, Shibata-gun (JP); Ryuichi Onodera, Shibata (JP); Tsuyoki Tayama, Shibata-gun (JP); Takenobu Sato, Shibata-gun (JP); Takashi Ebata, Shibata-gun (JP)

(73) Assignees: TOHOKU UNIVERSITY, Sendai (JP); TOHOKU STEEL CO., LTD., Shibata-Gun (JP)

( * ) Notice: Subject to any disclaimer, the term of this patent is extended or adjusted under 35 U.S.C. 154(b) by 315 days.

(21) Appl. No.: 18/281,865

(22) PCT Filed: Mar. 4, 2022

(86) PCT No.: PCT/JP2022/009375
§ 371 (c)(1),
(2) Date: Sep. 13, 2023

(87) PCT Pub. No.: WO2022/196391
PCT Pub. Date: Sep. 22, 2022

(65) Prior Publication Data
US 2024/0310259 A1    Sep. 19, 2024

(30) Foreign Application Priority Data
Mar. 15, 2021    (JP) .................. 2021-041320

(51) Int. Cl.
*G01N 5/02* (2006.01)
*G01G 7/02* (2006.01)
*G01G 23/32* (2006.01)

(52) U.S. Cl.
CPC .................. *G01N 5/02* (2013.01); *G01G 7/02* (2013.01); *G01G 23/32* (2013.01)

(58) Field of Classification Search
CPC .................. G01N 5/02; G01N 15/0606; G01N 15/0656; G01G 7/02; G01G 23/32; G01G 3/165; G01H 13/00; G01L 1/10
See application file for complete search history.

(56) References Cited

U.S. PATENT DOCUMENTS

2007/0089515 A1*    4/2007    Shih .................. G01N 29/036
73/579

FOREIGN PATENT DOCUMENTS

CN    206431142 U    *   8/2017
JP    S61-292039 A    12/1986
(Continued)

OTHER PUBLICATIONS

English Machine Translation of CN 206431142 (Year: 2017).*
(Continued)

*Primary Examiner* — David Z Huang
(74) *Attorney, Agent, or Firm* — Oliff PLC

(57) ABSTRACT

A load sensor and load detector for detecting the weight of tiny substances such as viruses or bacteria and includes a resonance generator causing a vibrating unit to resonate, a load sensor, and a voltage detector that detects change in induced electromotive force in a pick-up. The load sensor includes the vibrating unit, pick-up, and a substance adsorbent. The vibrating unit includes a magnetostrictive element capable of resonating. The pick-up generates an induced current using inverse magnetostrictive effect of the magne- (Continued)

tostrictive element resulting from the vibrating unit vibrations. The substance adsorbent is provided at the vibrating unit, is composed of an antibody to viruses or bacteria and at least partially covers the vibrating unit. The pick-up is composed of a coil with the vibrating unit arranged inside the coil. The vibrating unit is formed by bonding the magnetostrictive element and a soft magnetic body to each other.

17 Claims, 12 Drawing Sheets

(56) References Cited

FOREIGN PATENT DOCUMENTS

| | | |
|---|---|---|
| JP | H06-241920 A | 9/1994 |
| JP | 2009-236607 A | 10/2009 |
| JP | 2011-17605 A | 1/2011 |
| JP | 2013-520992 A | 6/2013 |
| WO | 2018/230154 A1 | 12/2018 |

OTHER PUBLICATIONS

Narita et al.; "A Review of Piezoelectric and Magnetostrictive Biosensor Materials for Detection of COVID-19 and Other Viruses;" Advanced Materials; 2021; pp. 1-24; vol. 33, No. 1.
Apr. 5, 2022 Search Report issued in International Patent Application No. PCT/JP2022/009375.

* cited by examiner

FIG.8
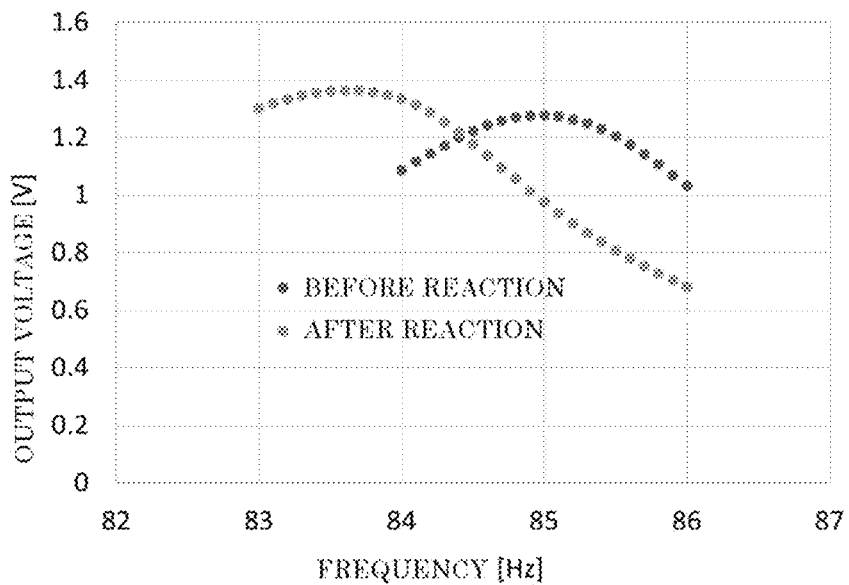
RESONANCE FREQUENCY : 85.0 Hz →83.7 Hz (1.3Hz)
OUTPUT
    VOLTAGE (@85.0 Hz):1.276 V→0.975 V (300 mV)
FIG.9    (A)    (B)
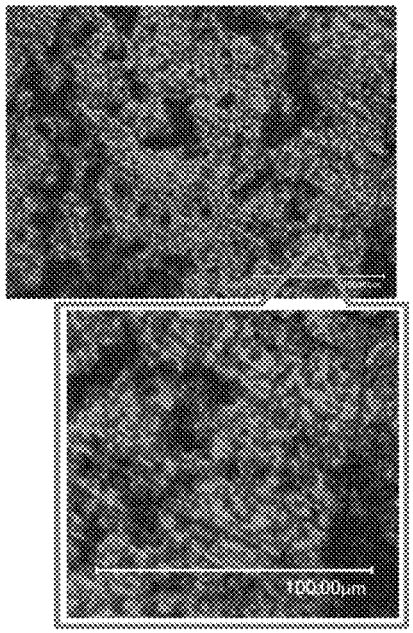
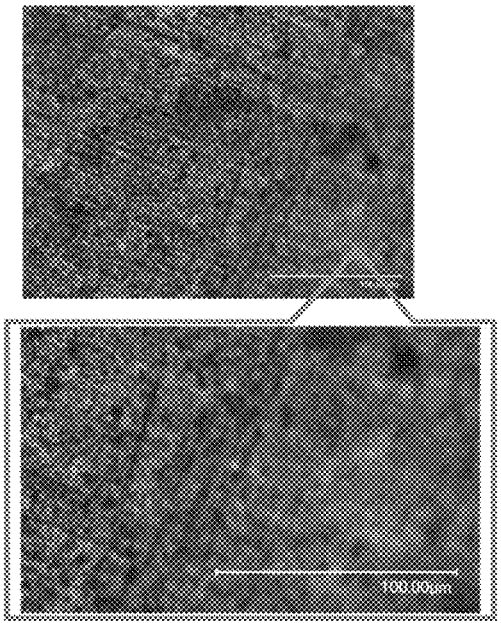
SILICA PARTICLES
ON GOLD SURFACE OF TEST STRIP
BACK SIDE OF TEST STRIP

LOAD SENSOR AND LOAD DETECTOR

FIELD OF THE INVENTION

The present invention relates to a load sensor and a load detector for detecting viruses, bacteria, or other substances.

DESCRIPTION OF RELATED ART

In a load sensor conventionally disclosed, load is received by a magnetostrictive element that is increased or reduced in magnetic permeability in response to stress increase caused by application of the load and a magnetostrictive element that is reduced or increased in magnetic permeability in response to stress reduction caused by application of the load, the changes in magnetic permeability of these magnetostrictive elements resulting from application of the load on the magnetostrictive elements are sensed using respective electromagnetic pick-ups, and the load is detected on the basis of a difference in inductance between the electromagnetic pick-ups (see Patent Literature 1, for example).

CITATION LIST

Patent Literature

Patent Literature 1: JP-A-6-241920

SUMMARY OF THE INVENTION

However, the load sensor disclosed in Patent literature 1 has a problem in that it has difficulty in detecting the weight of tiny substances such as viruses or bacteria.

The present invention has been made focusing on such a problem. It is an object of the present invention to provide a load sensor and a load detector capable of detecting even the weight of tiny substances such as viruses or bacteria.

To attain the above object, a load sensor according to the present invention comprises: a vibrating unit having a magnetostrictive element or a piezoelectric element capable of resonating; a pick-up that generates an induced current or an induced voltage using inverse magnetostrictive effect of the magnetostrictive element or piezoelectric effect of the piezoelectric element resulting from vibration of the vibrating unit; and a substance adsorbent provided at the vibrating unit.

In the load sensor according to the present invention, when the vibrating unit resonates and a substance is adsorbed on the substance adsorbent to increase the weight thereof, a resonance frequency of the vibrating unit reduces to reduce induced electromotive force in the pick-up. Detecting this change in induced electromotive force allows detection of the weight of the substance adsorbed on the substance adsorbent. Even the existence of tiny substances such as viruses or bacteria is detectable. The vibration of the vibrating unit further causes the substance adsorbent to vibrate to facilitate adsorption of the substance thereon. The substance adsorbent may be configured to adsorb the substance by physical adsorption or by chemical adsorption.

The substance adsorbent may be composed of an antibody to viruses or bacteria. In this case, it is possible to detect viruses or bacteria responsive to the antibody.

Preferably, the vibrating unit is covered at least partially with the substance adsorbent. In this case, a substance is adsorbed easily onto the substance adsorbent.

Preferably, the pick-up is composed of a coil with the vibrating unit arranged inside the coil. In this case, it is possible to easily detect reduction in induced electromotive force resulting from reduction in resonance frequency of the vibrating unit.

Preferably, the vibrating unit is formed by bonding the magnetostrictive element and a soft magnetic body to each other. In this case, the magnetostrictive element provides large inverse magnetostrictive effect, so that an induced current can be generated efficiently at the pick-up.

The substance adsorbent may be composed of a CD13 antibody. In this case, it is possible to detect human coronavirus HCoV-229E.

Preferably, the magnetostrictive element is composed of an Fe—Co based alloy having a plate-like shape, the soft magnetic body is composed of an alloy based on Ni and 0 to 20% by mass of Fe or an Ni—Co based alloy having a plate-like shape, and the vibrating unit has a configuration composed of a clad plate with the magnetostrictive element and the soft magnetic body and supported in a cantilever manner at one end of the vibrating unit.

In this case, the load of tiny substances such as viruses or bacteria is detected effectively.

The load sensor according to the present invention can be used in an environment such as under water or in a vacuum in addition to use in the air.

A load detector according to the present invention comprises: the load sensor described above; a resonance generator that causes the vibrating unit to resonate; and a voltage detector that detects change in induced electromotive force in the pick-up.

The resonance generator is composed of a vibrator, for example. The resonance generator may be composed of an alternating-current magnetic field generator that applies an alternating-current magnetic field to the vibrating unit or a piezoelectric material that applies an alternating-current voltage to the vibrating unit.

In the load detector according to the present invention, the resonance generator causes the vibrating unit to resonate using the load sensor according to the present invention and change in induced electromotive force in the pick-up is detected by the voltage detector. By doing so, it is possible to detect the weight of a substance adsorbed on the substance adsorbent. The load detector according to the present invention is not limited to a device that detects a weight numerically but further includes a device that detects the existence of a substance on the basis of change in weight.

A load detector according to the present invention may comprise: the load sensor described above; a resonance generator that causes the vibrating unit to resonate; and a radio information transmitter that transmits a signal by radio about a resonance frequency of the vibrating unit using electromagnetic induction energy generated by the pick-up.

In this case, when a substance is adsorbed on the substance adsorbent to increase the weight thereof, a resonance frequency of the vibrating unit reduces. This change in resonance frequency is transmitted as a signal by radio from the radio information transmitter using the electromagnetic induction energy. By doing so, it becomes possible to detect the weight of the substance adsorbed on the substance adsorbent.

Preferably, the radio information transmitter includes: a rectifier circuit that converts an alternating-current voltage resulting from induced electromotive force in the pick-up to a direct-current voltage; a capacitor that stores electric charge output from the rectifier circuit; and a radio information transmission circuit. If electrostatic energy stored in the capacitor is equal to or higher than energy required for making one radio information transmission, the radio information transmission circuit makes radio transmissions using the electrostatic energy.

In this case, when a substance is adsorbed on the substance adsorbent to increase the weight thereof, induced electromotive force in the pick-up reduces to reduce a speed at which the capacitor stores electric charge. This changes an interval between transmissions from the radio information transmission circuit. Detecting this change allows the weight of the substance adsorbed on the substance adsorbent to be detected.

A magnet that applies a bias magnetic field to the load sensor may be provided.

In this case, the amount of electric power generated by the pick-up is increased. This makes it possible to shorten an interval between transmissions in the radio communication from the radio information transmission circuit, extend a distance of the transmission, or increase sensor information.

The load detector according to the present invention may further comprise: a radio information receiving circuit that receives radio information from the radio information transmission circuit; and detecting means that detects an interval between receptions by the radio information receiving circuit.

In this case, it is possible to detect the weight of a substance adsorbed on the substance adsorbent on the basis of change in interval between receptions detected by the detecting means.

A load sensor according to the present invention may comprise: two vibrating units each having a magnetostrictive element or a piezoelectric element capable of resonating; two pick-ups that generate induced currents or induced voltages using inverse magnetostrictive effects of the magnetostrictive elements or piezoelectric effects of the piezoelectric elements resulting from vibrations of the vibrating units; and a substance adsorbent provided at one of the vibrating units.

In this case, by causing the two vibrating units to vibrate simultaneously and comparing changes in induced electromotive force between the pick-ups, it is possible to detect adsorption of a substance on the substance adsorbent. This is particularly effective if the substance adsorbent is composed of a CD13 antibody, as this allows detection of coronavirus even under vibration in the natural world where the vibrating unit does not always necessarily vibrate at the same frequency.

The load sensor according to the present invention is used preferably by being attached to a vibrating body. Any vibrating body to vibrate is applicable. However, in order to generate an induced current efficiently at the pick-up, a vibrating body to vibrate in a vibrating direction of the vibrating unit and to vibrate at a substantially constant frequency including a natural vibration frequency of the vibrating unit is preferred. The vibrating body is an industrial machine such as a pump or a motor, for example. The vibrating unit may be formed by bonding a soft magnetic body and a magnetostrictive element to each other to produce composite magnetostrictive elements in large quantities, and by cutting out an intended part shape from the composite magnetostrictive elements.

In the load sensor according to the present invention, the magnetostrictive element is preferably composed of an Fe—Co based alloy or an Fe—Al based alloy. In this case, magnetostrictive elements to provide large inverse magnetostrictive effect can be manufactured easily by performing rolling or heat processing on the Fe—Co based alloy or the Fe—Al based alloy available at relatively low cost. Such magnetostrictive elements have good workability and can be easily subjected to plastic working such as cutting or bending, so that they can easily be formed into arbitrary shapes.

The soft magnetic body is composed of an Fe—Ni based alloy typified by pure iron or PB permalloy, silicon steel, or electromagnetic stainless steel, for example. The soft magnetic body has coercive force that is preferably equal to or less than 8 A/cm, particularly preferably 3 A/cm. The soft magnetic body may be composed of a magnetostrictive element having magnetostriction of a sign differing from that of the magnetostriction of the magnetostrictive element described above. As materials therefor, one of the soft magnetic body and the magnetostrictive element may be composed of an Fe—Co based alloy or an Fe—Al based alloy having positive magnetostriction, and the other may be composed of an alloy based on Ni and 0 to 20% by mass of Fe or an Ni—Co based alloy having negative magnetostriction. In this case, by taking advantage of inverse magnetostrictive effect provided by compressive stress and tensile stress generated simultaneously in response to vibration, it is possible to generate an induced current efficiently at the pick-up.

The soft magnetic body and the magnetostrictive element may be bonded to each other by any method such as thermal diffusion bonding, hot rolling, hot drawing, an adhesive, or welding. In particular, if the bonding is realized by thermal diffusion bonding, hot rolling, or hot drawing, domain wall displacement easily occurs at the magnetostrictive element as a result of residual stress generated after bonding at high temperature and then cooling. This facilitates magnetization change to allow an induced current to be generated efficiently at the pick-up.

The soft magnetic body and the magnetostrictive element may be bonded to each other under application of a load. In this case, domain wall displacement easily occurs at the magnetostrictive element as a result of residual stress generated when the load is removed after the bonding. This facilitates magnetization change to allow an induced current to be generated efficiently at the pick-up.

The vibrating unit may have a part at one or more positions where stress concentration occurs in response to vibration. In this case, it is possible to increase change in magnetic flux density in the vicinity of the part of stress concentration during vibration. By adjusting the position of the stress concentration and the position of the pick-up, it is possible to increase efficiency in generating an induced current at the pick-up. The part of stress concentration can be formed by changing a sectional shape of the vibrating unit in a direction along the length thereof, for example.

The vibrating unit may be formed by bonding of a solid such as stainless steel or a wooden material, for example, other than a soft magnetic body to the magnetostrictive element by thermal diffusion bonding, hot rolling, or hot drawing.

The vibrating unit may be formed by bonding the solid and the magnetostrictive element to each other with an adhesive or by welding under application of a load. In these cases, domain wall displacement easily occurs at the magnetostrictive element as a result of residual stress even if it is inferior to the displacement occurring in the case of using the soft magnetic body. Thus, magnetization change is facilitated to allow an induced current to be generated efficiently at the pick-up.

According to the present invention, it is possible to provide a load sensor and a load detector capable of detecting even the weight of tiny substances such as viruses or bacteria.

BRIEF DESCRIPTION OF THE DRAWINGS

FIG. 8 is a graph showing experimental result about detection of the silica particles used in the mock virus using the load detector illustrated in FIG. 2.

FIG. 9 includes (A) a microscope photograph and (B) a microscope photograph, respectively showing a front surface and a back surface of the substance adsorbent on which the silica particles used in the mock virus are adsorbed by the load detector illustrated in FIG. 2.

DETAILED DESCRIPTION OF THE INVENTION

Embodiments of the present invention will be described below with reference to the drawings.

Figure 1:
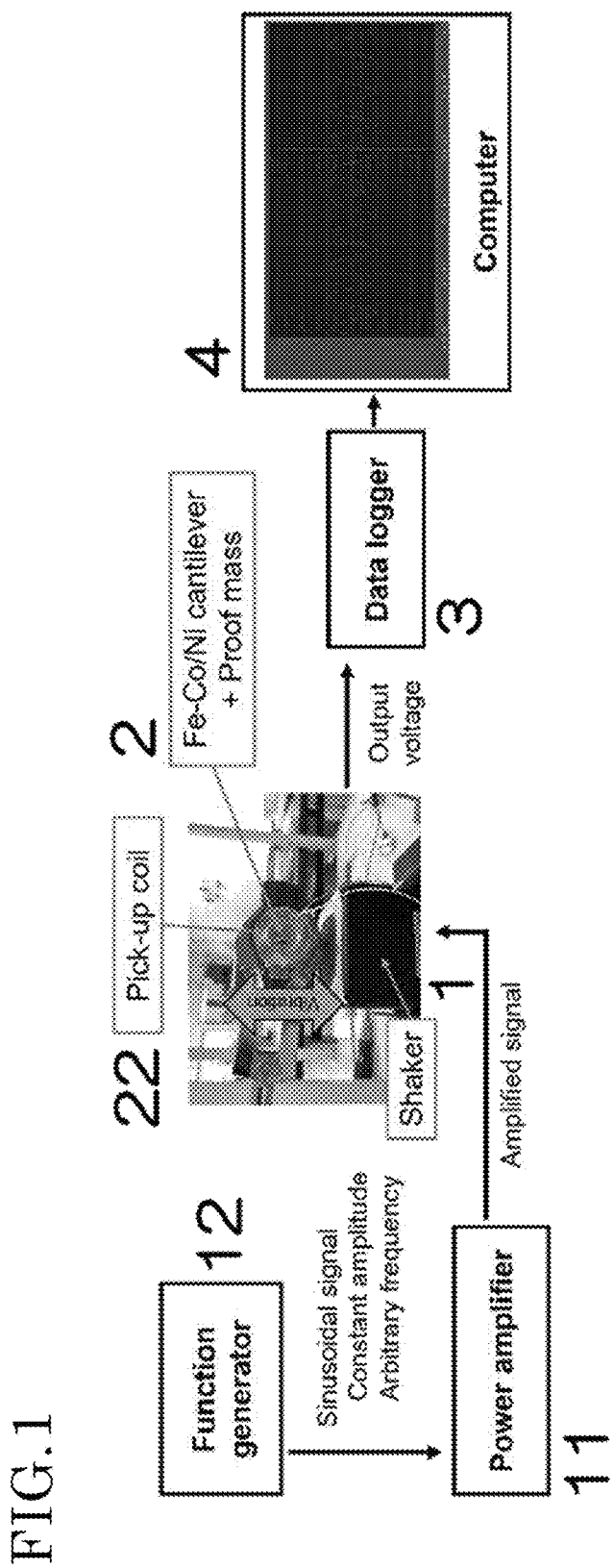
FIG. 1 is a schematic view illustrating a load detector according to an embodiment of the present invention.

As shown in FIG. 1, a load detector includes a resonance generator 1, a load sensor 2, a data logger 3, and a computer 4.

The resonance generator 1 is composed of a vibrator. The resonance generator 1 is connected to a function generator 12 through a power amplifier 11. The function generator 12 outputs a sinusoidal signal of a constant amplitude and an arbitrary frequency. A signal amplified by the power amplifier 11 is output to the resonance generator 1. The resonance generator 1 is configured to input this amplified signal and vibrate at a constant amplitude.

Figure 2:
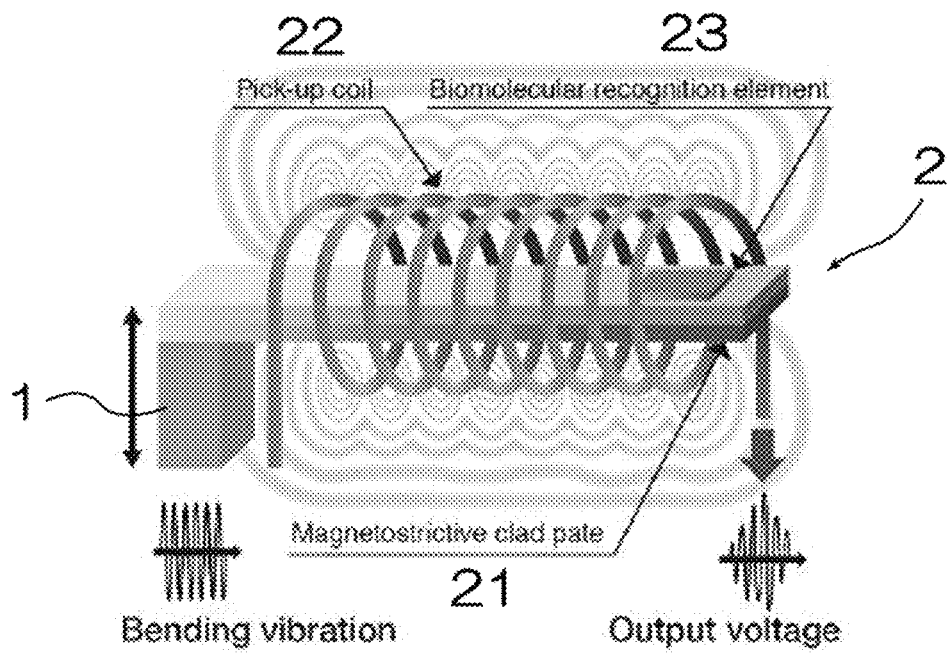
FIG. 2 is a schematic view illustrating a load sensor according to the embodiment of the present invention.

As shown in FIG. 2, the load sensor 2 includes a vibrating unit 21, a pick-up 22, and a substance adsorbent 23.

The vibrating unit 21 is composed of a clad plate prepared by overlaying and bonding a magnetostrictive body having an elongated rectangular plate-like shape and a soft magnetic body having the same shape on each other along their entire planes. The vibrating unit 21 has an energy harvesting function. The soft magnetic body is composed of an alloy based on Ni and 0 to 20% by mass of Fe (including pure Ni), an Ni—Co based alloy, or pure iron, for example, which is a different type of magnetic material from the magnetostrictive element. The magnetostrictive element is composed of an Fe—Co based alloy or an Fe—Al based alloy, for example. The vibrating unit 21 may be composed of a piezoelectric element.

The vibrating unit 21 is supported in a cantilever manner with one end thereof attached to the resonance generator 1. The vibrating unit 21 is capable of resonating with vibration of the resonance generator 1.

The pick-up 22 is composed of a coil with the vibrating unit 21 arranged inside the coil, and is configured to generate an induced current using inverse magnetostrictive effect of the magnetostrictive element resulting from vibration of the vibrating unit 21. The substance adsorbent 23 is composed of an antibody to viruses or bacteria, and is attached to the vibrating unit 21 while covering the vibrating unit 21 on its free end side. The size of the substance adsorbent 23 and a position for attaching the substance adsorbent 23 are appropriately settable.

The data logger 3 and the computer 4 form a voltage detector that detects change in induced electromotive force (output voltage) in the pick-up 22. The data logger 3 stores data about the induced electromotive force in the pick-up 22 and transmits the data to the computer 4. The computer 4 detects change in induced electromotive force in the pick-up 22 on the basis of the data from the data logger 3.

Operation will be described next.

At the load detector, the function generator 12 outputs a sinusoidal signal of a constant amplitude and an arbitrary frequency. A signal amplified by the power amplifier 11 is output to the resonance generator 1. The resonance generator 1 inputs this amplified signal and vibrates at a constant amplitude. The vibrating unit 21 resonates with the vibration of the resonance generator 1, thereby further causing the substance adsorbent 23 to vibrate to facilitate adsorption of a substance thereon. If a substance such as a virus is adsorbed on the substance adsorbent 23 of the load sensor 2 to increase the weight (load) thereof, a resonance frequency of the vibrating unit 21 is reduced to change induced electromotive force (output voltage) in the pick-up 22.

The data logger 3 stores data about the induced electromotive force in the pick-up 22. On the basis of the data from the data logger 3, the computer 4 detects change in induced electromotive force in the pick-up 22. Detecting this change in induced electromotive force allows detection of the weight of a substance adsorbed on the substance adsorbent 23. By designing the magnetostrictive element and the vibrating unit 21 optimally, it becomes possible to detect a weight on the order of micrograms or nanograms. It is also possible to detect viruses or bacteria responsive to an antibody, so that the existence of tiny substances such as viruses or bacteria is detectable. Using an antibody to severe acute respiratory syndrome coronavirus (SARS-CoV-2) as the antibody allows detection of SARS-CoV-2.

Example 1

Vibrating units were prepared by attaching proof masses (weights) having respective masses of 1, 2, 4, 7, and 10 mg to Fe—Co/Ni clad plate cantilevers of a length of 50 mm, a width of 5 mm, and a thickness of 0.2 mm on their free end sides. A vibrating unit without an attached proof mass was also prepared. Masking tape composed of paper was used as the proof masses. According to Example, an adhesive in the masking tape forms a substance adsorbent. A pick-up coil having turns of about 4200 and a coil resistance of 7.47 kΩ was prepared, mounted on a base, and the vibrating units were each arranged inside the pick-up coil in such a manner as to generate an induced current in response to vibration of the vibrating unit. The vibrating units were each attached to a vibrator in such a manner as to have a free length of 33 mm and forced displacement vibration was applied using the vibrator. Induced electromotive force (output voltage) Vpp was recorded with a sampling period of 100 s using a data logger (Keyence NR-500, Keyence Co., Japan).

Figure 3:
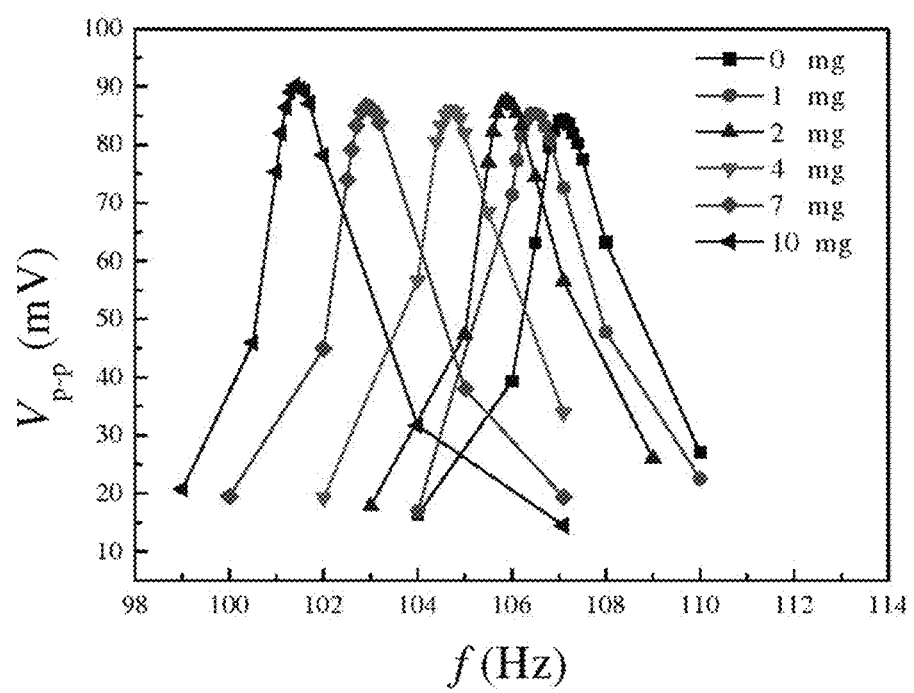
FIG. 3 is a graph showing a relationship between a resonance frequency of a vibrating unit and induced electromotive force (output voltage) in a pick-up measured by the load detector illustrated in FIG. 2.
Figure 4:
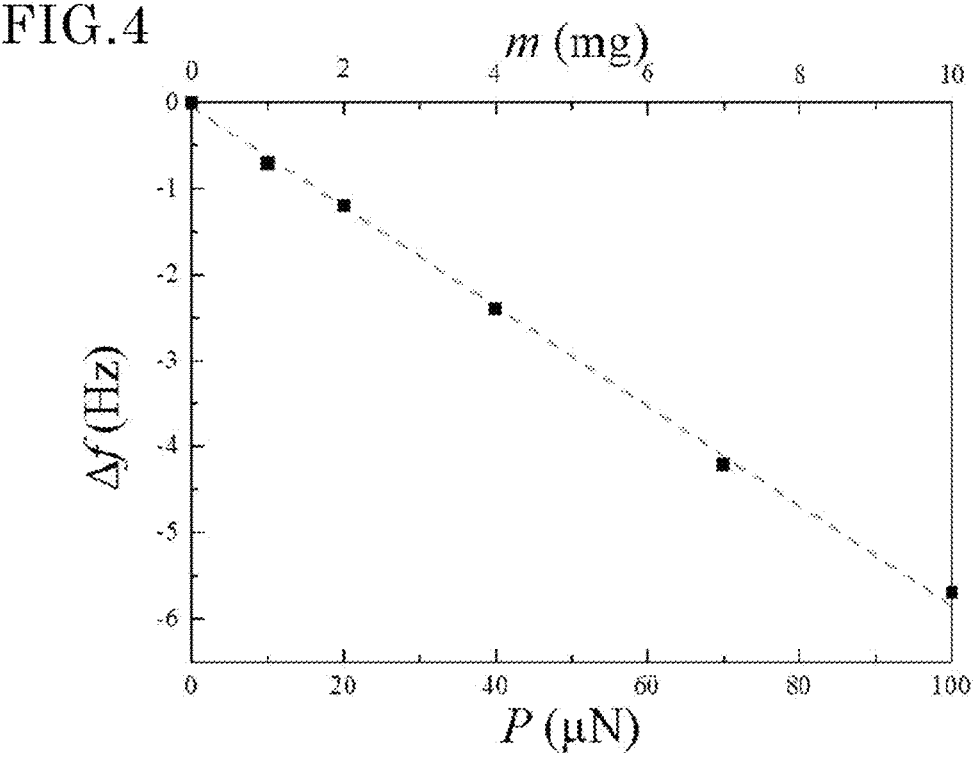
FIG. 4 is a graph showing a relationship between a frequency shift of the vibrating unit and the weight of a substance adsorbent measured by the load detector illustrated in FIG. 2.
Figure 5:
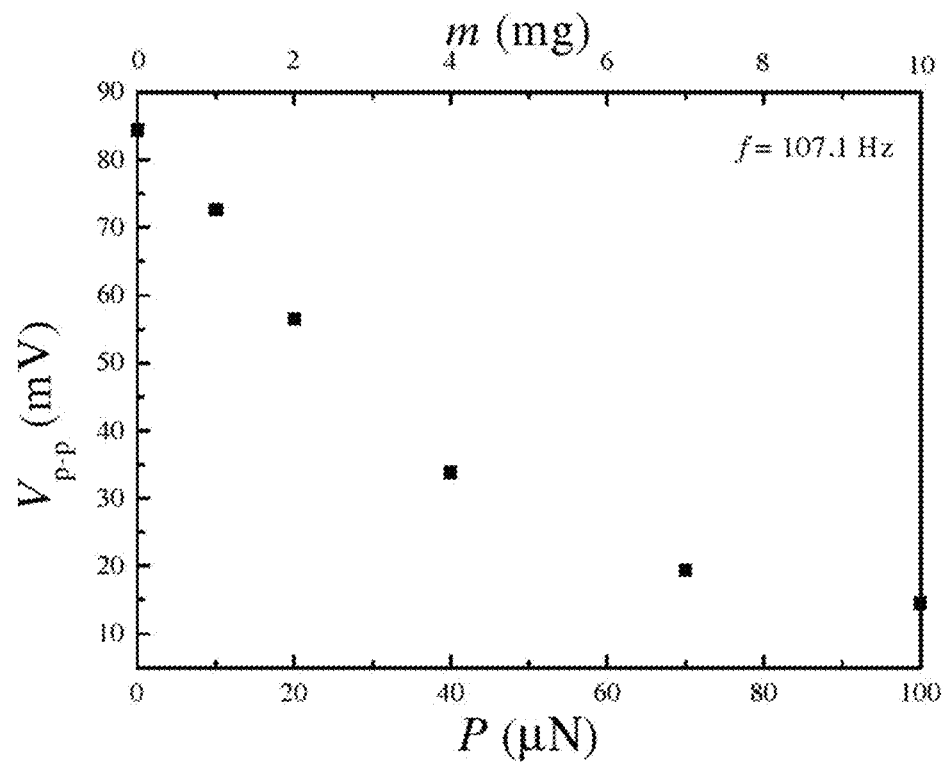
FIG. 5 is a graph showing a relationship between induced electromotive force (output voltage) in the pick-up and the weight of the substance adsorbent measured by the load detector illustrated in FIG. 2.

Result thereof is shown in FIGS. 3 to 5.

As shown in FIG. 3, a resonance frequency of the vibrating unit without a proof mass was about 107. 1 Hz. As the weight of the proof mass increases, a resonance frequency reduced and maximum induced electromotive force (maximum output voltage) increased slightly. FIG. 4 shows a relationship between a frequency shift resulting from the proof mass, the weight of the proof mass, and corresponding surface stress. The frequency shift is found to reduce linearly in response to increase in weight or stress. In response to weight increase of 1 mg, a frequency reduced by about 0.75 Hz.

FIG. 5 shows a relationship between induced electromotive force (output voltage), the weight of the proof mass, and corresponding surface stress. The induced electromotive force reduced by about 12 mV at a weight of 1 mg.

The result therefrom showed that the load detector is capable of detecting the weight of the proof mass. In particular, the result showed that, on the basis of the change by 12 mV in the induced electromotive force, a weight of about 1 mg can be detected. Induced electromotive force in a magnetostrictive element increases in proportion to the number of turns of a coil. Thus, increasing the number of turns of the coil allows detection of a smaller weight.

Example 2

Figure 6:
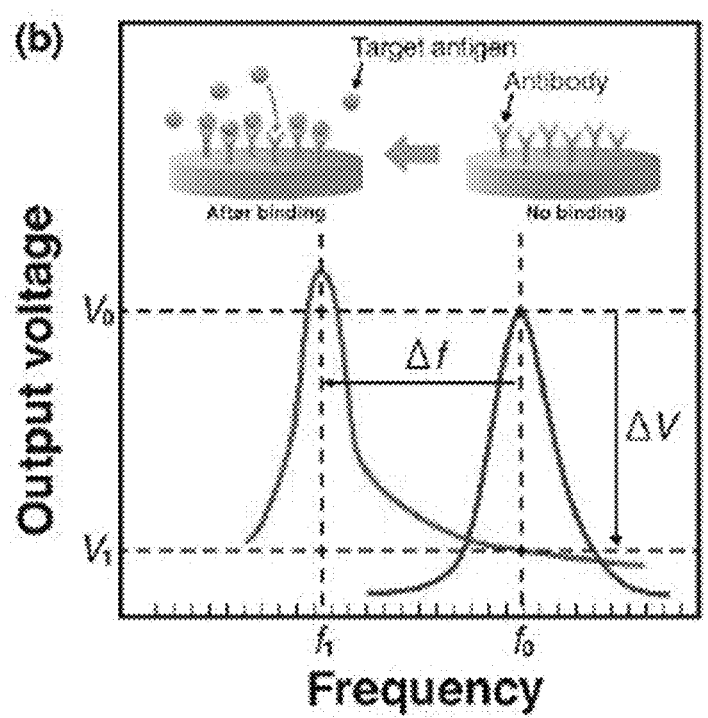
FIG. 6 is a graph showing a relationship between a resonance frequency of the vibrating unit and induced electromotive force (output voltage) in the pick-up being detected by the load detector illustrated in FIG. 2.

To use the load detector as a magnetostrictive biosensor, a surface of the cantilever of the vibrating unit is covered with a biomolecular recognition element without using a proof mass in the configuration of Example 1. An antibody can be used as the biomolecular recognition element. In response to application of an alternating-current (AC) magnetic field to the vibrating unit, bending vibration is generated by magnetostrictive effect to exhibit physical resonance. As shown in FIG. 6, if an antigen is bound to an antibody fixed to a surface of the vibrating unit, a fundamental resonance frequency f0 of the vibrating unit without antigen binding reduces to f1. This shift of a resonance frequency can be monitored using a pick-up coil.

The vibrating unit functions as a bending vibration energy harvesting device. In the absence of adsorption of an antigen on an antibody, collected electric power can always be used for transmitting air conditions to big data. In particular, if the vibrating unit is used for energy harvesting to receive bending vibration, the vibrating unit functions as a biosensor without requiring an alternating-current magnetic field.

Driving a sensor and communicating data requires electric power from several microwatts to several milliwatts. Using batteries for a large number of sensors causes a considerably serious social problem in terms of environment, resources, and cost. In response to this, attention is being paid to energy harvesting of collecting electric power from unused energy (vibration, heat, light, radio waves, etc.) widely existing in natural environment. The collected electric power is expected to be used as electric power for sensor driving or data communication. The load detector is available as a self-powered virus sensor utilizing a resonance phenomenon.

Example 3

Figure 7:
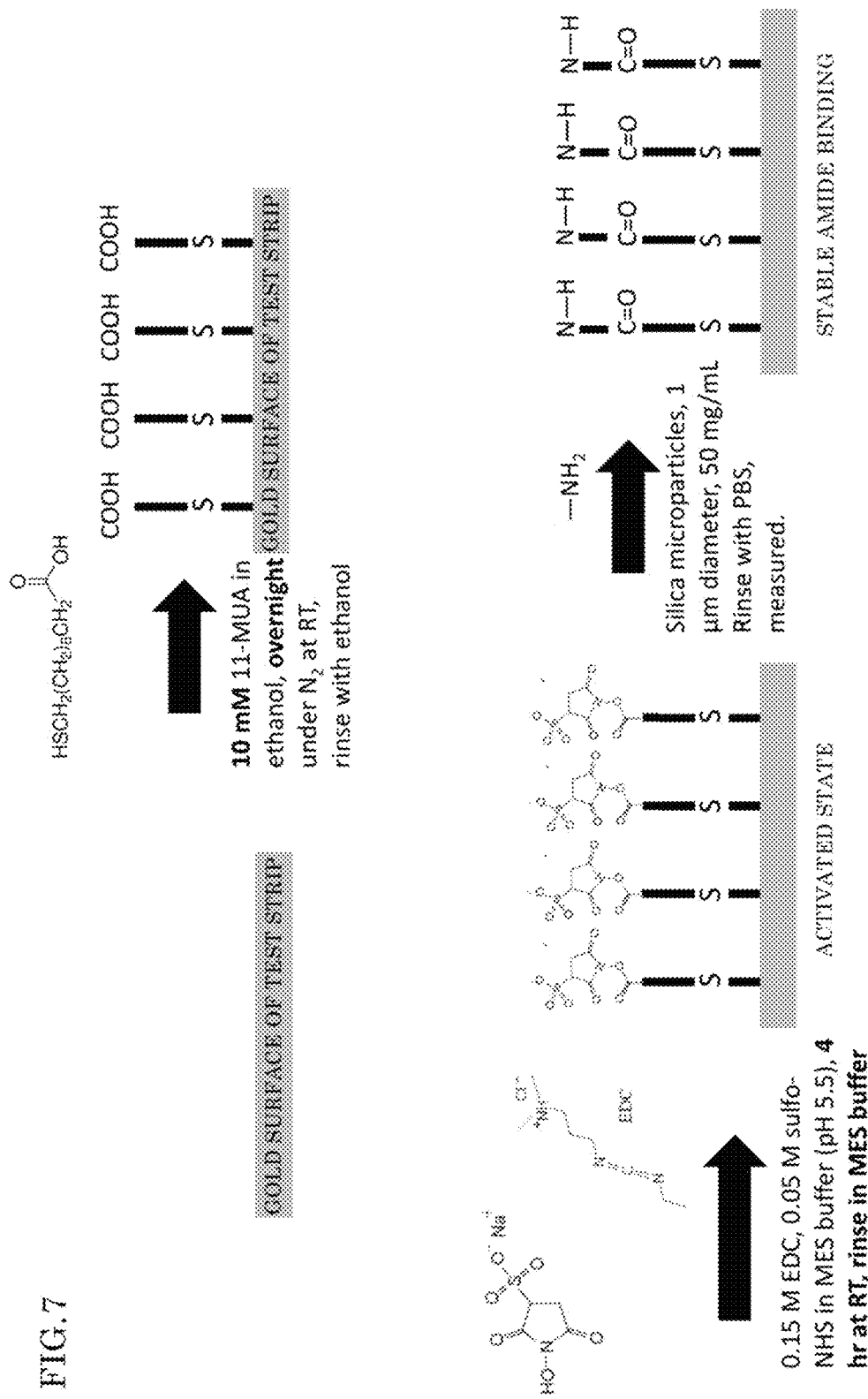
FIG. 7 is an explanatory view explaining a method of adsorbing silica particles used in a mock virus.

An experiment of detecting a mock virus was conducted using a load detector having the configuration of Example 1. Silica particles were used as the mock virus. A test strip having a gold surface was attached to the vibrating unit and the silica particles were detected by a silica particle adsorption method. As shown in FIG. 7, according to the silica particle adsorption method, 10 mM of a 11-mercaptoundecanoic acid (11-MUA) ethanol solution was reacted overnight in a nitrogen gas atmosphere and at room temperature on the gold surface of the test strip, the gold surface was rinsed with ethanol, and a resonance frequency was measured.

Next, an MES buffer solution (pH 5.5) containing 0.15 M of EDC and 0.05 M of Sulfo-NHS was reacted for four hours at room temperature, and the test strip surface was rinsed with the MES buffer solution to be activated. Silica particles of 1 m and 50 mg/mL were reacted for 12 hours, rinsed with phosphate buffered saline (PBS), and a resonance frequency was measured.

Result thereof is shown in FIG. 8. As shown in FIG. 8, after the reaction, a resonance frequency changed from 85.0 Hz to 83.7 Hz compared to that before the reaction. Induced electromotive force (output voltage) changed from 1.276 V to 0.975 V at 85 Hz, resulting in reduction of 300 mV. This shows that adhesion of the silica particles was detected. The silica particles can also be confirmed from result of observation under a microscope shown in FIG. 9.

Example 4

Powder of iron (Fe) and cobalt (Co) was melted in a high frequency induction vacuum melting furnace and was casted. A resultant ingot was hot-forged into a slab. Then, the slab was subjected to hot rolling and cold rolling to be processed into a plate-like shape having a thickness of 0.1 mm. The rolled plate was cut. A nickel (Ni) plate having a thickness of 0.1 mm was prepared by the same procedure as that for the Fe—Co alloy plate. The Fe—Co plate having positive magnetostrictive property and the Ni plate having negative magnetostrictive property were diffusion bonded to each other to form a clad plate. The Fe—Co/Ni clad plate having a thickness of 0.2 mm was cut into a predetermined shape.

Figure 10:
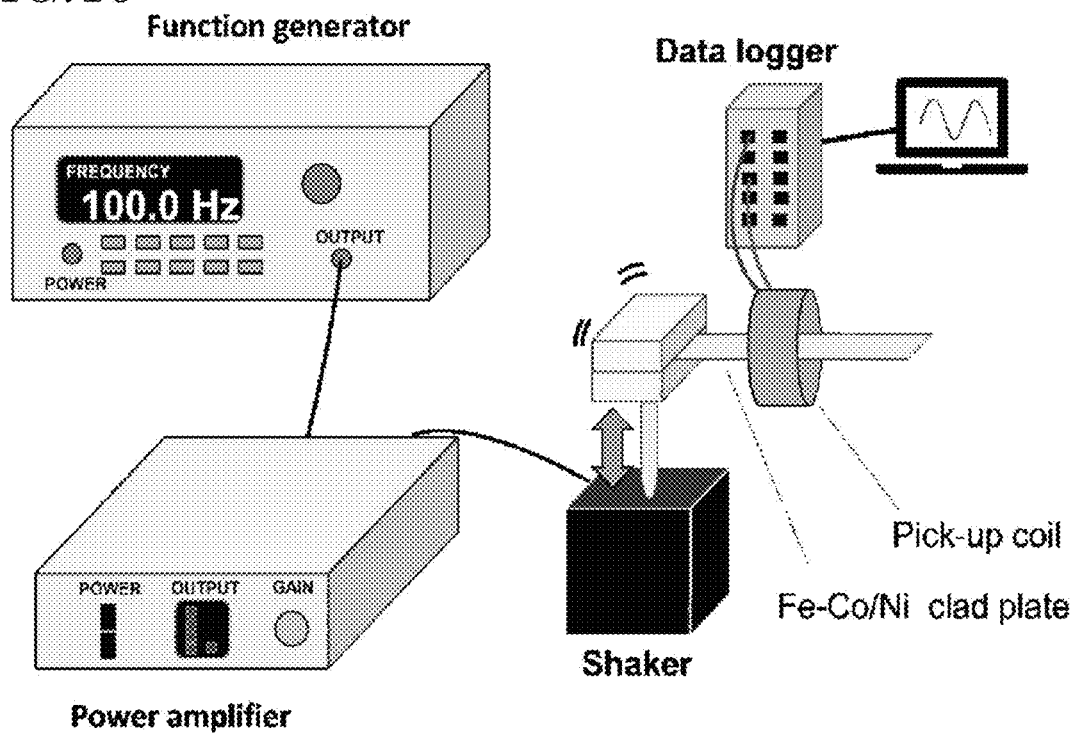
FIG. 10 is a schematic view illustrating the configuration of a load detector according to Example 4 of the present invention.

As illustrated in FIG. 10, one end of the prepared Fe—Co/Ni clad plate having a thickness of 0.2 mm and a width of 5 mm was attached to a vibrating and shaking machine (ET-132, Labworks Inc., USA). A free length was 34 mm. Bending vibration was applied using a shaker driven by a function generator (33250A, AgilentTechnologies, Japan) and a power amplifier (PA-151, Labworks Inc., USA). The Fe—Co/Ni clad plate was surrounded by a pick-up having 28000 turns and a resistance of 11.7 kΩ, and an output voltage Vout from the clad plate was monitored using a data logger (NR-500, Keyence Co., Japan). An amplitude A of the shaker changes with a frequency f. An acceleration $a=A(2\pi f)2=170$ m/sec$^2$ was applied. Next, electric power Pout output from the clad plate was evaluated using the output voltage Vout and a load resistance R at a resonance frequency.

Example 5

Figure 11:
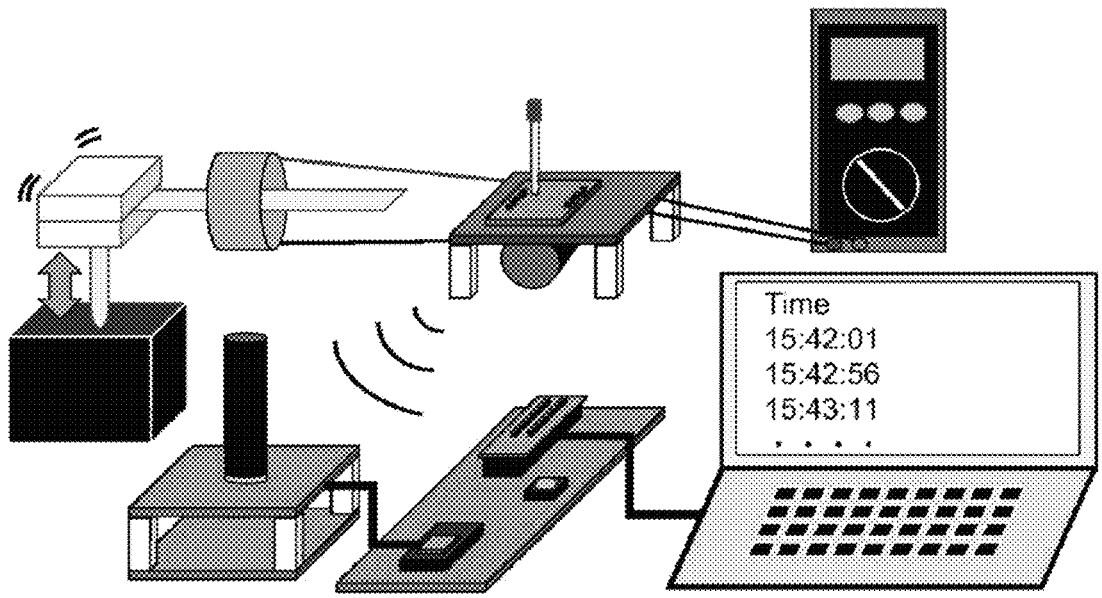
FIG. 11 is a schematic view illustrating the configuration of a load detector according to Example 5 of the present invention.

FIG. 11 shows a schematic view of energy storage and a radio communication system. An Fe—Co/Ni clad plate same as that used in Example 4 was used as the vibrating unit. A radio information transmitter is composed of a circuit that transmits a signal at a direct-current (DC) voltage of 2.0 V and is connected to the clad plate. A capacitor has a capacity of 1000 μF. A rectifier circuit that converts an alternating-current voltage generated at the Fe—Co/Ni clad plate in response to bending vibration to a direct-current voltage and stores the direct-current voltage into the capacitor is connected between the clad plate and the radio information transmitter. The direct-current voltage stored in the capacitor was measured using a voltmeter. Furthermore, a received signal and time of the receipt were recorded on a personal computer. An experiment was conducted at a bias magnetic field of 0 and 10 mT. A neodymium magnet was used as the bias magnetic field.

Human coronavirus 229E (HCoV-229E) was used in the experiment. A retrovirus purification mini kit (product name "ViraTrap," cat. V1172-02, Biomiga Inc.) was used as a purification kit. Before implementation of an HCoV-229E detection test, in order to examine mass detection performance of the Fe—Co/Ni clad plate, an experiment was conducted with an attempt to detect mock virus particles.

CD13/aminopeptidase N is a type II glycoprotein from 150 to 160 kDA as a membrane peptidase. CD13/aminopeptidase N is an external enzyme widely expressed having a plurality of functions (expressed as a dimer extending 10.5 nm over surfaces of a plurality of cells). CD13 cleaves N terminal amino acid from peptide, induces inactivation or decomposition of the peptide, functions as a biomarker for leukemia, and is involved in tumor infiltration. CD13 further functions as a receptor for HCoV-229E spike glycoprotein binding to start cell invasion and infection. A receptor-binding domain of HcoV-229E has developed in such a manner as to have higher binding affinity than before (from a level up to 440 nm to a level up to 30 nm). CD13 is frequently used as a receptor for HCoV-229E or as a receptor for HCoV-229E spike protein in a cell-based assay. However, using only CD13 to make CD13 function as a bioreceptor for HCoV-229E itself is a novel method.

CD13 was used as a novel biological recognition layer for HCoV-229E. The feasibility of this capture method was first confirmed using a fluorescence microscope and an aminosilane-treated glass slide (CD13 was fixed on a surface of the glass slide using a glutaraldehyde crosslinking method). An anti-His tag antibody conjugated with a fluorescent dye (trademark "Alexa Fluor 488") was used as a fluorescent label, and was bound to the surface of the CD13-modified glass slide with His tag. Steric hindrance by virus hinders conjugation of the fluorescent label. This means that reduction in fluorescent signal exhibits success of viral binding.

Figure 12:
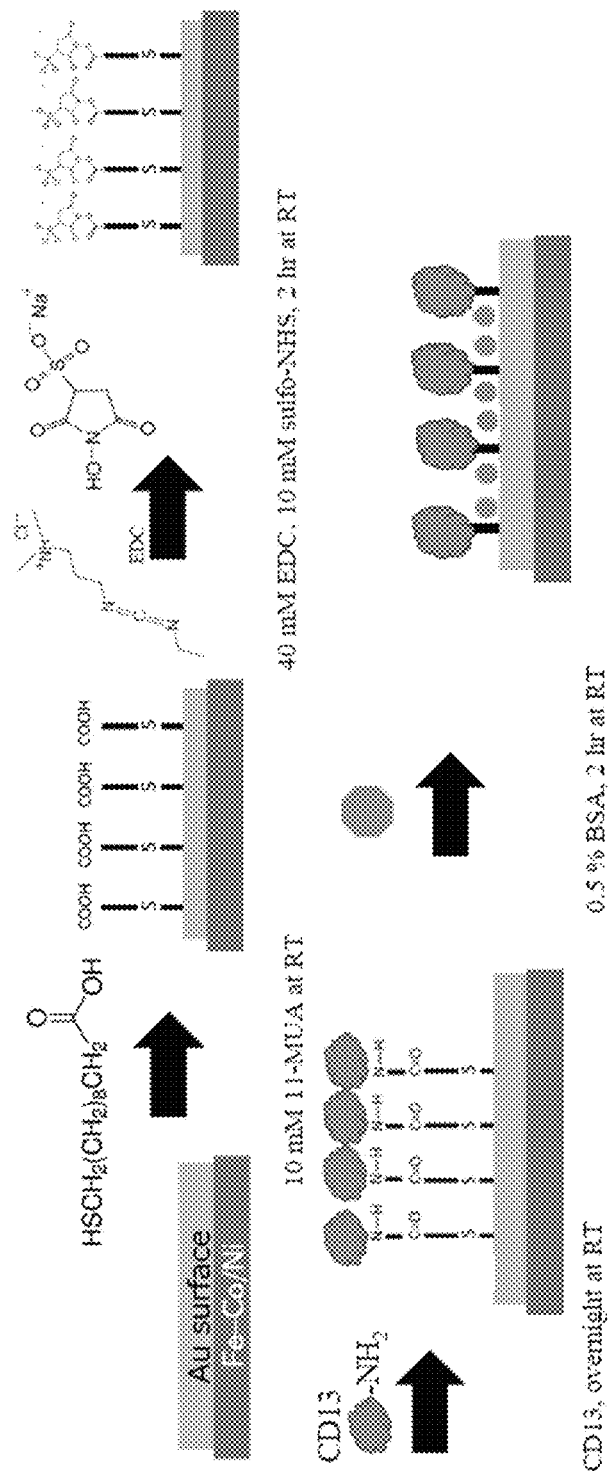
FIG. 12 is a schematic view illustrating a processing step of biological functionalization for a vibrating unit employed in the load detector according to Example 5 of the present invention.

FIG. 12 illustrates biological functionalization for an Fe—Co/Ni clad plate. Gold (Au) films were sputtered on both surfaces of the clad plate having a length of 30 mm, a width of 5 mm, and a thickness of 0.2 mm to facilitate the biological functionalization, thereby preventing rust on the surfaces. Next, the plate covered with Fe—Co/Ni was cleaned by being immersed in Milli-Q, acetone, isopropanol, and 99.5% ethanol in this order.

The Fe—Co/Ni clad plate was soaked overnight at room temperature (RT) in 10 mM of 11-mercaptoundecanoic acid (11-MUA, 2 mL in ethanol, available from Sigma-Aldrich) in a 2 mL-test tube covered with aluminum. The 11-MUA provided a self-assembled monolayer (SAM) having a COOH group on a surface. The plate covered with Fe—Co/Ni was first rinsed with ethanol and then rinsed with an MES (2-(N-morpholino)ethanesulfonic acid) buffer solution (pH 5.5). Next, the plate was immersed in 40 mM of EDC (1-ethyl-3-[3-dimethylaminopropyl]carbodiimide) and 10 mM of sulfo-NHS (N-hydroxysulfosuccinimide) in the MES buffer solution (pH 5.5). The plate was covered with Al foil for protection from light and left at room temperature for two hours. The EDC/NHS reacted with the —COOH group to form sulfo-NHS ester having amine reactivity (see the upper row in FIG. 12).

Next, for conducting a virus detection experiment, the plate covered with Fe—Co/Ni was soaked in a CD13 protein solution overnight at room temperature. CD13 (25 μg/mL) was also diluted with the MES buffer. The Fe—Co/Ni clad plate was rinsed with PBS (phosphate buffered saline, pH 7.4) to remove unreacted CD13. Next, the CD13-modified clad plate was subjected to a bovine serum albumin (BSA) blocking step (see the lower row in FIG. 12).

Figure 13:
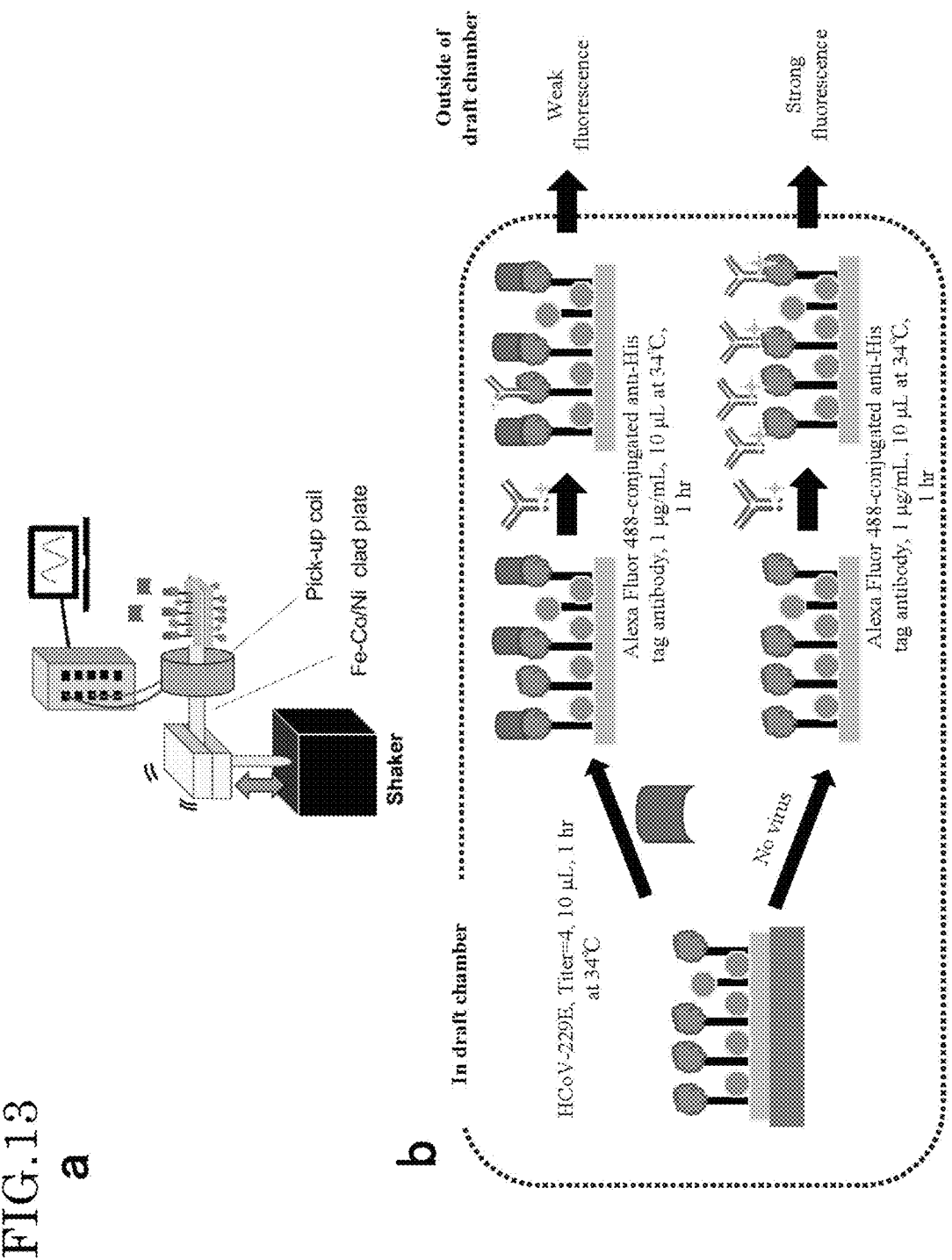
FIG. 13 includes (a) a schematic view illustrating a setup state of a sensing test and (b) a schematic view illustrating a processing step on the vibrating unit after the sensing test, each relating to the load detector according to Example 5 of the present invention FIG. 14 includes (a) a graph showing an output voltage at the vibrating unit and (b) a graph showing a relationship between output electric power and a load resistance at the vibrating unit, each relating to the load detector according to Example 5 of the present invention.

FIG. 13a illustrates a setup for an HCoV-229E sensing test. The experiment was conducted using the Fe—Co/Ni clad plate under application of bending vibration. CD13 was fixed using a self-assembled monolayer with a —COOH group to form amide binding together with a —NH2 group on CD13. An output voltage and a frequency were measured. The feasibility of HCoV-229E sensing using the clad plate was confirmed.

After implementation of the HCoV-229E sensing test, the surface of the Fe—Co/Ni clad plate was incubated for one hour at 34° C. together with the anti-His tag antibody conjugated with the fluorescent dye (trademark "Alexa Fluor 488") (1 µg/mL in PBS solution) (see FIG. 13b). In FIG. 13b, the Au surface was rinsed with PBS to remove an unreacted anti-His tag antibody. Then, observation was carried out under a fluorescence microscope (available from Olympus Corporation) having a filter with Ex from 460 to 490 nm and Em from 510 nm. A fluorescence image was observed at an exposure of 250, 400 or 700 milliseconds and a magnification that is generally 10.

Result

Figure 14:
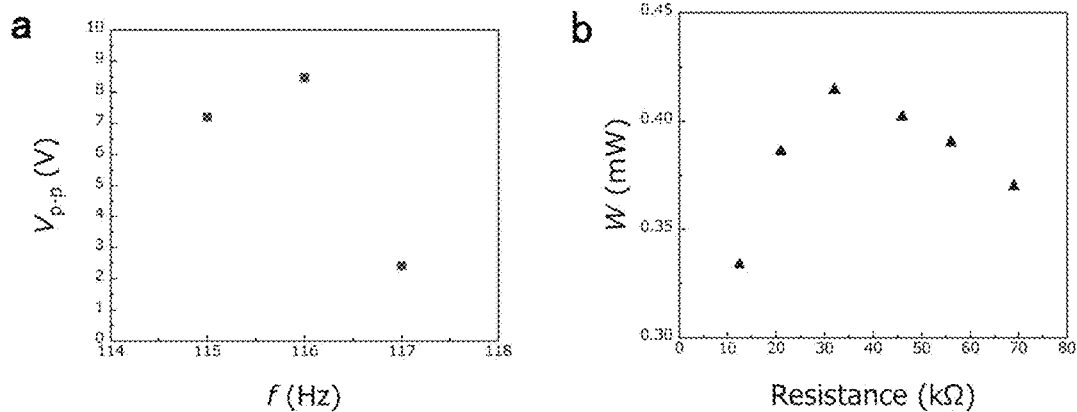

FIG. 14a shows an output voltage (peak-to-peak voltage Vp-p) from the Fe—Co/Ni clad plate obtained from a vibration energy harvesting test from 115 to 117 Hz. The output voltage was about 8.4 V at a resonance frequency of 116 Hz. FIG. 14b shows a relationship between output electric power from the Fe—Co/Ni clad plate and a load resistance at 116 Hz. The output electric power increased with increase in a load resistance R, reached its maximum at R=32 kΩ, and then reduced. The obtained maximum electric power was about 0.414 mW (12 mW/cm$^3$).

Figure 15:
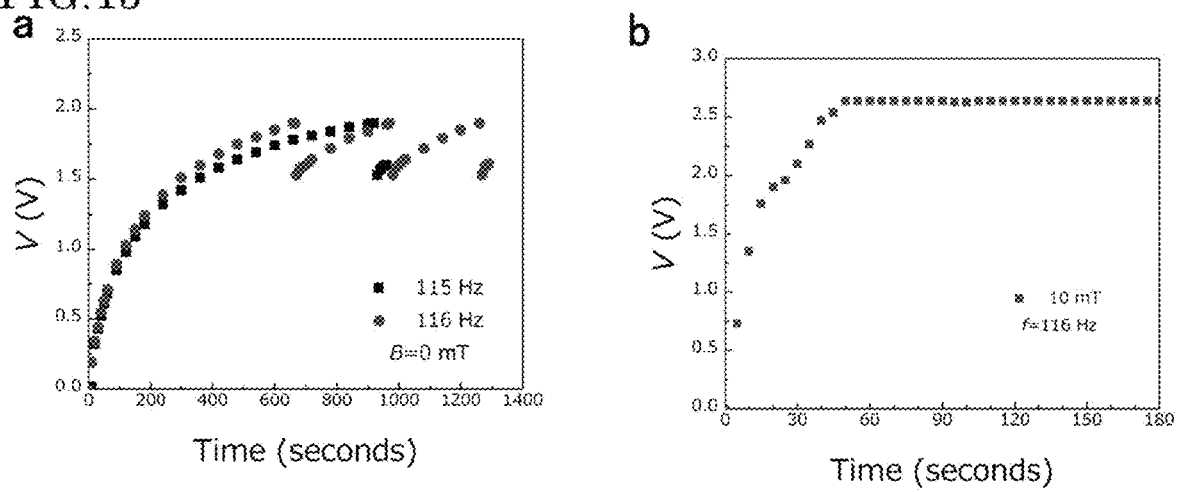
FIG. 15 includes (a) a graph showing a relationship between a direct-current (DC) voltage stored in a capacitor and time in the absence of a bias magnetic field at the vibrating unit and (b) a graph showing a relationship between a direct-current (DC) voltage stored in the capacitor and time in the presence of a bias magnetic field at the vibrating unit, each relating to the load detector according to Example 5 of the present invention.

FIG. 15a shows a relationship between a direct-current voltage stored in a capacitor and time at the Fe—Co/Ni clad plate at 115 Hz and 116 Hz in the absence of a bias magnetic field. The stored direct-current voltage increases with passage of time. In a resonant state (116 Hz), the stored direct-current voltage is found to reach about 1.9 V about 670 seconds later and then reduce. The reason therefor is that a signal was transmitted wirelessly to a remote PC. Here, the signal means time when voltage reduction occurred. Then, electric power storage is started again to increase the direct-current voltage. About 980 seconds later, the stored direct-current voltage reached about 1.9 V again and then reduced for second radio communication. Third radio communication is found to have occurred about 1270 seconds later. Meanwhile, at 115 Hz beyond the resonance frequency, recovery of the direct-current voltage took time and a first signal was transmitted by radio about 930 seconds later. As a frequency separates further away from the resonance frequency, the peak-to-peak voltage (Vp-p) of the output voltage is reduced further to take longer time for recovering the direct-current voltage. As a result, an interval between signal transmissions is increased. Employing this radio communication system allows the clad plate to transmit a signal using electric power obtained from bending vibration, so that an interval between signal transmissions can be monitored without using a battery. In other words, it is possible to detect deviation from the resonant state on the basis of a time interval between signal transmissions by radio. For example, if a substance adheres to the Fe—Co/Ni clad plate, the weight of the clad plate changes to change the resonance frequency. In this way, it is possible to detect adhesion of the substance to the Fe—Co/Ni clad plate on the basis of information about the time interval.

FIG. 15b shows a relationship between a direct-current voltage stored in the capacitor and time at the Fe—Co/Ni clad plate at 116 Hz in the presence of a bias magnetic field of 10 mT. The stored direct-current voltage increased, reached about 1.9 V in a short time, and a signal was transmitted by radio. Even after the radio communication, the stored direct-current voltage shows substantially no reduction and is maintained at about 2.6 V. A first signal was transmitted about 20 seconds later and signals were transmitted continuously thereafter every 10 seconds. Here, a shortest interval between transmissions in a radio information transmission circuit was set 10 seconds. This shows that energy required for one radio communication was stored within 10 seconds.

As a receptor-binding domain is at a different place, influence should be avoided from fixation of CD13 to an APS glass slide on capability of receptor binding to HCoV-229E spike glycoprotein. To confirm this and to evaluate binding of CD13 to HCoV-229E, a fluorescent assay involving incubation periods of one hour and 24 hours was employed. A simulated competition binding assay was employed by incubating HCoV-229E on the CD13-modified APS glass slide. Next, an anti-His tag antibody conjugated with a fluorescent dye (trademark "Alexa Fluor 488") was incubated. By doing so, steric hindrance by virus occurs to allow prevention of binding of a fluorescent probe to the His tag on CD13. As a result, binding of the virus to CD13 reduces fluorescence.

Figure 16:
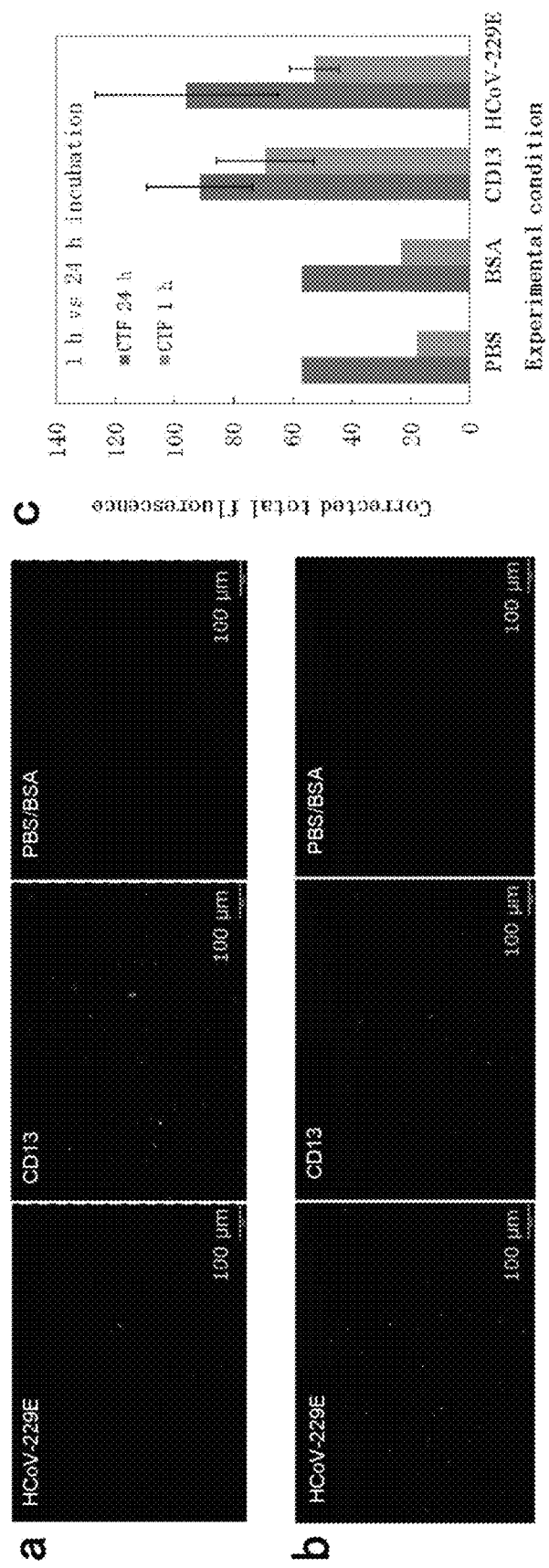
FIG. 16 includes (a) a fluorescence image after one-hour incubation of HCoV-229E virus, a fluorescence image without virus, and a fluorescence image after treatment with PBS and BSA, (b) a fluorescence image after 24-hour incubation of HCoV-229E virus, a fluorescence image without virus, and a fluorescence image after treatment with PBS and BSA, and (c) a graph showing total fluorescence corrected under each condition.

FIG. 16 shows a fluorescence image of HCoV-229E and corrected total fluorescence. As shown in FIG. 16(c), while fluorescence reduces after one-hour incubation of a virus, fluorescence does not reduce after 24-hour incubation. The one-hour incubation was sufficient for binding of the virus to CD13. Meanwhile, a high CTF in each of PBS and BSA under negative control shows that the 24-hour incubation induced increase in non-specific binding. Furthermore, as shown in FIGS. 16(a) and (b), compared to the case of the one-hour incubation, increase in fluorescence signal aggregated in 24 hours is shown in a fluorescence image. This shows that longer virus incubation time might have influenced integrity of CD13 protein to induce clustering. Amide binding to fix CD13 protein is considerably stable through cross-linking. For this reason, the one-hour virus incubation period was used for conformation of CD13-virus binding.

Figure 17:
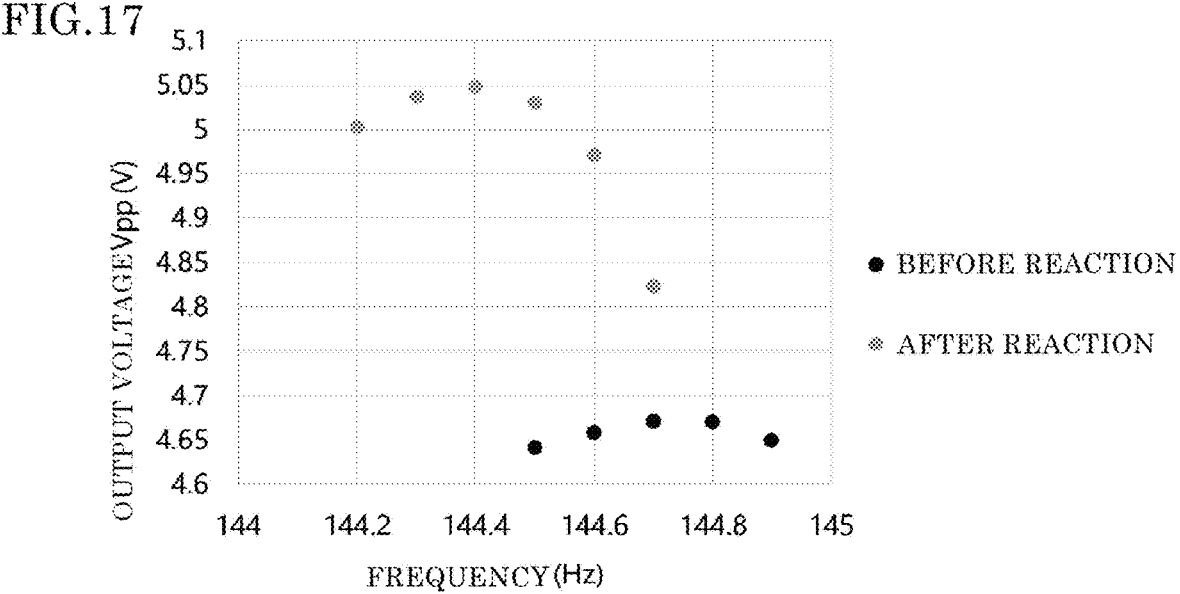
FIG. 17 is a graph showing a relationship between a frequency and an output voltage before and after one-hour incubation of HCoV-229E virus relating to the load detector according to Example 5 of the present invention.

Virus detection was tested through magnetostriction measurement. The measurement was conducted before and after one-hour incubation of the Fe—Co/Ni clad plate in a sample solution of HCoV-229E at 33 to 34° C. and 4% of $CO_2$. Significant reduction in resonance frequency of about 0.3 Hz from 144.7 Hz to 14.4 Hz was determined (see FIG. 17). On the assumption that the virus solution did not have a particular defined concentration and had a virus titer of about 3, estimated frequency change of 0.1 Hz was obtained for each virus titer.

Figure 18:
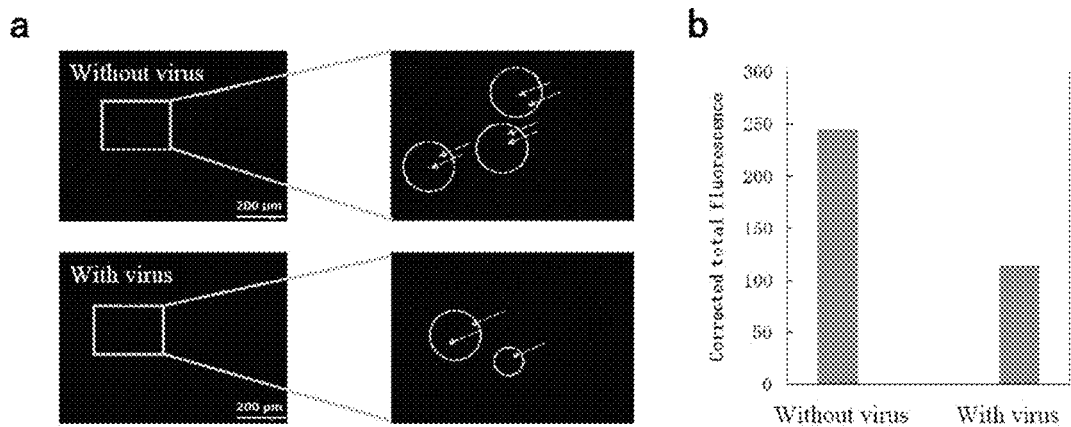
FIG. 18 includes (a) a fluorescence image after one-hour incubation of a vibrating unit with fixed CD13 in a solution without HCoV-229E virus and a fluorescence image after one-hour incubation of this vibrating unit in a solution with HCoV-229E virus, and (b) a graph showing total fluorescence corrected under each condition.

Next, by checking CD13-virus binding first under a fluorescence microscope, HCoV-229E was detected using the Fe—Co/Ni clad plate. Two CD13-modified clad plates were incubated separately for one hour in different sample solutions with or without HCoV-229E, both at 33 to 34° C. and 4% of $CO_2$. The incubations were conducted further with an anti-His tag antibody conjugated with a fluorescent dye (trademark "Alexa Fluor 488"), and then the clad plates were observed under the fluorescence microscope (see FIG. 18a). As shown in FIG. 18b, plotted result indicates that, in comparison to the incubation without the virus, fluorescence reduction was also determined after the incubation with the virus. This means that the virus is bound to the CD13-modified clad plate successfully.

As described above, the availability of CD13 as a bioreceptor for detecting HCoV-229E using a fluorescence microscope and a simulated competition binding assay was confirmed. As a result of application of CD13 to a magnetostrictive Fe—Co/Ni cantilever for magnetostriction measurement, a novel biological recognition method for CD13 provisionally worked successfully also in a magnetostrictive cantilever biosensor. Furthermore, a direct-current voltage was stored by utilizing high energy harvesting performance peculiar to a magnetostrictive material and radio information was transmitted using resultant electric power successfully. Application of a bias magnetic field was confirmed to provide a higher storage capacity. The experiment conducted using silica particles as a mock virus showed that a resonance frequency changes to a greater extent as a concentration becomes higher, thereby confirming applicability as a virus sensor. In the experiment conducted using HCoV-229E, change in resonance frequency between before and after reaction was determined, which is clearly different from result of the observation. By combining these results, it is possible to perform energy harvesting using various types of vibrations and at the same time, to transmit information about virus detection or the occurrence of change.

REFERENCE SIGNS LIST

1: Resonance generator
2: Load sensor
3: Data logger
4: Computer
11: Power amplifier
12: Function generator
21: Vibrating unit
22: Pick-up
23: Substance adsorbent

What is claimed is:

1. A load sensor comprising:
a vibrating unit having a magnetostrictive element or a piezoelectric element capable of resonating;
a pick-up that generates an induced current or an induced voltage using inverse magnetostrictive effect of the magnetostrictive element or piezoelectric effect of the piezoelectric element resulting from vibration of the vibrating unit; and
a substance adsorbent provided at the vibrating unit, wherein
the vibrating unit is formed by bonding the magnetostrictive element and a soft magnetic body to each other,
the magnetostrictive element is composed of an Fe—Co based alloy having a plate-like shape,
the soft magnetic body is composed of an alloy based on Ni and 0 to 20% by mass of Fe an Ni—Co based alloy having a plate-like shape, and
the vibrating unit has a configuration composed of a clad plate with the magnetostrictive element.

2. The load sensor according to claim 1, wherein the substance adsorbent composed of an antibody to viruses or bacteria.

3. The load sensor according to claim 2, wherein the vibrating unit is covered at least partially with the substance adsorbent.

4. A load sensor comprising:
two vibrating units each having a magnetostrictive element or a piezoelectric element capable of resonating;
two pick-ups that generate induced currents or induced voltages using inverse magnetostrictive effects of the magnetostrictive elements or piezoelectric effects of the piezoelectric elements resulting from vibrations of the vibrating units; and
a substance adsorbent provided at one of the vibrating units,
wherein at least one of the vibrating units is formed by bonding the magnetostrictive element and a soft magnetic body to each other, the magnetostrictive element is composed of an Fe—Co based alloy having a plate-like shape, the soft magnetic body is composed of an alloy based on Ni and 0 to 20% by mass of Fe or an Ni—Co based alloy having a plate-like shape, and the at least one of the vibrating units has a configuration composed of a clad plate with the magnetostrictive element.

5. The load sensor according to claim 1, wherein the pick-up is composed of a coil with the vibrating unit arranged inside the coil.

6. The load sensor according to claim 1, wherein the substance adsorbent is composed of a CD13 antibody.

7. The load sensor according to claim 1, wherein the vibrating unit is supported in a cantilever manner at one end of the vibrating unit.

8. The load sensor according to claim 7, wherein the substance adsorbent is composed of a CD13 antibody.

9. A load detector comprising:
the load sensor according to claim 1;
a resonance generator that causes the vibrating unit to resonate; and
a voltage detector that detects change in induced electromotive force in the pick-up.

10. The load detector according to claim 9, wherein the resonance generator is composed of a vibrator.

11. The load detector according to claim 9, wherein the resonance generator is composed of an alternating-current magnetic field generator that applies an alternating-current magnetic field to the vibrating unit or a piezoelectric material that applies an alternating-current voltage to the vibrating unit.

12. A load detector comprising:
the load sensor according to claim 1;
a resonance generator that causes the vibrating unit to resonate; and
a radio information transmitter that transmits a signal by radio about a resonance frequency of the vibrating unit using the induced current or the induced voltage at the pick-up.

13. The load detector according to claim 12, wherein the radio information transmitter includes:
a rectifier circuit that converts an alternating-current voltage resulting from induced electromotive force in the pick-up to a direct-current voltage;
a capacitor that stores electric charge output from the rectifier circuit; and
a radio information transmission circuit, if electrostatic energy stored in the capacitor is equal to or higher than energy required for making one radio information transmission, the radio information transmission circuit making radio transmissions using the electrostatic energy.

14. The load detector according to claim 13, wherein the substance adsorbent is composed of a CD13 antibody.

15. The load detector according to claim 13, comprising a magnet that applies a bias magnetic field to the load sensor.

16. The load detector according to claim 13, comprising:
a radio information receiving circuit that receives radio information from the radio information transmission circuit; and
detecting means that detects an interval between receptions by the radio information receiving circuit.

17. A load detector comprising:
a load sensor that includes:
a vibrating unit having a magnetostrictive element or a piezoelectric element capable of resonating;
a pick-up that generates an induced current or an induced voltage using inverse magnetostrictive effect of the magnetostrictive element or piezoelectric effect of the piezoelectric element resulting from vibration of the vibrating unit; and a substance adsorbent provided at the vibrating unit, and a radio information transmitter that transmits a signal by radio about a resonance frequency of the vibrating unit using the induced current or the induced voltage at the pick-up, wherein the radio information transmitter includes:

a rectifier circuit that converts an alternating-current voltage resulting from induced electromotive force in the pick-up to a direct-current voltage;

a capacitor that stores electric charge output from the rectifier circuit; and a radio information transmission circuit, if electrostatic energy stored in the capacitor is equal to or higher than energy required for making one radio information transmission, the radio information transmission circuit making radio transmissions using the electrostatic energy.

* * * * *